US012744356B2

(12) United States Patent
Kaszubowski et al.

(10) Patent No.: US 12,744,356 B2
(45) Date of Patent: Sep. 22, 2026

(54) CONNECTION PART HAVING DOUBLE BUSBARS

(71) Applicant: Auto-Kabel Management GmbH, Hausen i.W. (DE)

(72) Inventors: Franz-Heinz Kaszubowski, Wassenberg (DE); Martin Schloms, Aachen (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 239 days.

(21) Appl. No.: 18/689,787

(22) PCT Filed: Aug. 16, 2022

(86) PCT No.: PCT/EP2022/072824

§ 371 (c)(1),
(2) Date: Mar. 6, 2024

(87) PCT Pub. No.: WO2023/036564

PCT Pub. Date: Mar. 16, 2023

(65) Prior Publication Data

US 2024/0297467 A1 Sep. 5, 2024

(30) Foreign Application Priority Data

Sep. 10, 2021 (DE) ..................... 10 2021 123 489.1

(51) Int. Cl.
*H01R 25/16* (2006.01)
*H01R 13/502* (2006.01)
*H01R 13/52* (2006.01)

(52) U.S. Cl.
CPC ......... *H01R 25/162* (2013.01); *H01R 13/502* (2013.01); *H01R 13/521* (2013.01); *H01R 2201/26* (2013.01)

(58) Field of Classification Search
CPC .. H01R 25/162; H01R 13/502; H01R 13/521; H01R 2201/26
(Continued)

(56) References Cited

U.S. PATENT DOCUMENTS 4,781,621 A * 11/1988 Sugiyama .............. H05K 7/026
439/559
5,213,520 A * 5/1993 Casey .................. H01R 13/748
439/712
(Continued)

FOREIGN PATENT DOCUMENTS

DE 827512 C 1/1952
DE 10 2018 216 965 B3 1/2020
(Continued)

OTHER PUBLICATIONS

European Patent Office, International Search Report and Written Opinion of the International Searching Authority, Application No. PCT/EP2022/072824, dated Jan. 27, 2023, 22 pages.

*Primary Examiner* — Gary F Paumen
(74) *Attorney, Agent, or Firm* — Merchant & Gould P.C.

(57) ABSTRACT

The invention relates to a connection part, a plug, and a system consisting of the connection part and plug. The connection part comprises two busbars that at least partially overlap with their broad faces and of which at least one has an end portion with a reduced width. The connection part thus has good electrical and thermal conductivity while also having a compact design and flexible connection characteristics.

21 Claims, 2 Drawing Sheets

(58) Field of Classification Search
USPC .......................................................... 439/559
See application file for complete search history.

(56) References Cited

U.S. PATENT DOCUMENTS

| | | | | |
|---|---|---|---|---|
| 9,017,099 | B2 * | 4/2015 | Ikeda | H01R 13/521 439/559 |
| 10,910,740 | B2 * | 2/2021 | Goto | H01R 9/223 |
| 2017/0027074 | A1 | 1/2017 | Ichikawa | |
| 2019/0020159 | A1 * | 1/2019 | Wynnik | H02G 5/007 |
| 2019/0036461 | A1 | 1/2019 | Böhmer et al. | |

FOREIGN PATENT DOCUMENTS

| | | | |
|---|---|---|---|
| WO | 2017/182129 | A1 | 10/2017 |
| WO | 2018/110071 | A1 | 6/2018 |
| WO | 2020/012914 | A1 | 1/2020 |

* cited by examiner

CONNECTION PART HAVING DOUBLE BUSBARS

The invention relates to a connection part, in particular for electric vehicles, to a plug, and to a system comprising a connection part and a plug.

One of the challenges in the electrification of automobility is the transmission of high currents within the vehicle. In particular, in the case of electrically operated vehicles, an electrical accumulator with a high capacity has to be charged as quickly as possible, preferably significantly faster than it is discharged afterwards during driving. For this purpose, the electrical conductors in the vehicle must be able to transport high charging powers with high currents and/or voltages. At the same time, the space requirement, the weight and not least the price of the conductors must be kept as low as possible.

In addition to the transmission of electrical current, the transmission, absorption, and dissipation of heat in the electrical distribution system is also an important task for the conductors.

In particular at transitions between different electrically conductive components, a junction resistance can be set at which heat is increasingly generated.

The subject matter was accordingly based on the object of providing a conductor arrangement that is as compact, lightweight and inexpensive as possible, that can transport high electrical power with the lowest possible electrical resistance, and that is also protected from overheating.

The connection part according to the invention comprises at least two busbars. In the following, at least one of the busbars will be described first.

In particular, the busbar has a substantially rectangular cross section. The cross section can have two mutually opposite and substantially parallel broad faces and two narrow faces arranged substantially perpendicular thereto, substantially parallel to one another and opposite one another. At least one of the narrow faces is in particular aligned perpendicular to at least one of the broad faces. The busbar has, at least in part, a longitudinal axis. Said longitudinal axis runs substantially perpendicular to both the narrow faces and the broad faces. The broad face is wider than the narrow face perpendicular to the longitudinal axis. A width can be defined as the width of the busbar in a direction perpendicular to the longitudinal axis and parallel to the broad face. The width can also be defined as the width in the direction perpendicular to the narrow face.

An axis that is aligned substantially perpendicular to the longitudinal axis and substantially parallel to at least one of the broad faces of the busbar and/or that is aligned substantially perpendicular to the narrow face of the busbar can be called a broad axis.

The longitudinal axis can have different orientations for different segments of the busbar. For example, the busbar can be deformed, in particular the busbar can be deformed about at least one broad axis. At least two mutually different segments of the busbar can consequently have longitudinal axes oriented differently from one another. In the case of a substantially straight busbar, the longitudinal axis of all segments of the busbar can have substantially the same orientation.

If the busbar is cut to length, an end face can also be defined. For example, the longitudinal axis can at least in part substantially form the surface normal thereto. The end face can in particular be aligned at least in part perpendicular to at least parts of the narrow faces and to at least parts of the broad faces.

The busbar is formed from an electrically conductive material, for example from a metal material. The busbar can be formed from copper, aluminum, alloys thereof, and/or from other metal materials. In particular, the busbar can be formed from soft-annealed aluminum. Aluminum is light, which is a great advantage for use in vehicles. In addition, aluminum is less expensive than copper. The busbar can also be formed from another material.

The busbar can be at least partially coated, for example with silver, gold, nickel and/or alloys thereof and/or multilayer arrangements thereof and/or combinations of these metal materials, for example with a nickel-plated silver coating.

The use of a busbar has the advantage that it provides good conductivity for heat and electrical currents due to its solid construction with high cross sections. Furthermore, the thermal capacity is high, in particular due to the volume of the busbar. Due to the increased surface area compared to round conductors, with the same cross-sectional area, more heat can also be radiated over the surface of the busbar.

At least one of the busbars can have a cross section of at least 50 $mm^2$, preferably between 100 and 300 $mm^2$. Larger cross sections are also possible if a particularly high electrical power is transmitted and/or a particularly large amount of heat has to be transported.

An overlap region can be defined for the at least two busbars. In the overlap region, the two busbars can overlap. In particular, the busbars can overlap in such a way that at least one of the busbars overlaps one of the broad faces of another one of the at least two busbars with one of its broad faces. In the overlap region of the at least two busbars, a broad face of a first of the at least two busbars can thus overlap a broad face of a second one of the at least two busbars. An overlap can mean that the at least two busbars at least partially overlap one another in a plan view of one of the broad faces of one of the busbars, in particular in the direction of a surface normal to at least one of the broad faces of at least one of the busbars.

In the overlap region, at least two of the at least two busbars can partially overlap one another. At least two of the at least two busbars can also overlap one another substantially completely at least in a part of the overlap region or substantially in the entire overlap region.

The longitudinal axes of the at least two busbars can run at least partially parallel to one another. In this case, the longitudinal axes of the at least two busbars can each be at least partially straight. However, for a parallel course of the longitudinal axes of the at least two busbars, it is not necessary for these to run straight in each case. The corresponding longitudinal axes of the busbars can also be deformed, for example bent. As long as the busbars follow one another in their deformation and/or, for example, maintain a constant distance from one another, the longitudinal axes are considered to be parallel to one another.

The at least two busbars can run substantially parallel to one another at least in parts of the overlap region. In particular, the distance between at least two of the at least two busbars, in particular between the broad faces of the busbars, each of which faces a broad face of another of the at least two busbars, can be substantially constant along the longitudinal axis of at least one of the busbars at least in a part of the overlap region.

The longitudinal axes of the at least two busbars can also be tilted relative to one another. For example, the broad faces of the at least two busbars can move away from one another along the longitudinal axis of at least one of the at least two busbars. Two of the at least two busbars can also be aligned with their broad faces at least substantially parallel to one another, while the longitudinal axes of the busbars are tilted relative to one another in a plane parallel to the broad faces. The busbars can also be tilted relative to one another about their respective longitudinal axes, so that the distance between two busbars varies along the broad axis of at least one of the busbars, in particular is greater on a first side than on the second side opposite the broad axis.

The broad faces of at least two of the at least two busbars can be aligned with their broad faces at least substantially parallel to one another at least in parts.

In addition to the overlap region, an end portion can be defined. The end portion is different from the overlap region. The end portion can be defined for one busbar in each case. A common end portion of the at least two busbars can also be defined in which in particular the end portions of at least two of the at least two busbars are arranged. In particular, the at least two busbars open into a common end portion with their corresponding end portions different from the overlap region.

A connection element can be arranged in each case on the at least two busbars. The connection element is arranged in each case in the end portion of the particular busbar. For at least two busbars and at least one connection element in each of the at least two busbars, there are also two connection elements. The connection elements of the at least two busbars are spaced apart from one another. In particular, the connection elements of at least two busbars can be spaced apart from one another along a broad axis of at least one of the at least two busbars. Alternatively or additionally, the connection elements can be spaced apart along a surface normal to at least one broad face of at least one of the at least two busbars.

The end portion of at least one of the busbars can in particular comprise the end of a busbar that has been cut to length.

The width of the end portion of at least one first of the at least two busbars can be reduced in comparison with a width of the first busbar in at least parts of the overlap region. The busbar can thus have, at least in part, a smaller width in the end portion than in the overlap region.

A reduced width of the busbar in the end portion, in other words a reduced width of the end portion of the busbar, can be advantageous in particular in the case of busbars that at least partially overlap, i.e., are arranged one above the other, for example. The overlap can thus in particular be eliminated in the end region.

The width of the end portion of a first of the at least two busbars can be reduced in such a way that the connection element of the second busbar is free of overlap by the end portion of the first busbar. As a result, the connection elements of the at least two busbars can be reached from a broad face of one of the at least two busbars overlapping one another.

The reduction in the width of the end portion of a first of the at least two busbars can substantially completely expose the connection part of a second of the at least two busbars. It can also partially expose the connection part. The connection part, including a safety distance around the connection part, can also be exposed by the first busbar. For example, the safety distance can be substantially at least half and/or the entire width of the connection part.

In particular, the at least two connection elements of the at least two busbars can be arranged substantially at the same position along the longitudinal axis of at least a part of at least one of the at least two busbars. This can mean that the at least two connection parts are substantially not spaced apart from one another along the longitudinal axis of at least a part of at least one of the at least two busbars and/or have a very small and/or substantially no distance from one another along this axis. In a plan view of at least one broad face of at least one of the at least two busbars, the connection elements can be spaced apart along a broad axis and in particular substantially not along the longitudinal axis.

Due to a reduced width of at least one of the at least two busbars, in particular in the end portion of the busbar, the contact elements of at least two of the at least two busbars can be reached starting from a broad face. In particular, it is therefore not necessary to contact the connection elements of at least two broad faces of the busbars of the connection part, which broad faces face away from one another. This applies in particular to contact elements that are not spaced apart from one another along the longitudinal axis of at least one of the at least two busbars and thus have the same position along the longitudinal axis of the at least one of the at least two busbars.

The end faces of the at least two busbars can terminate substantially flush with one another. This can mean that the end faces of the at least two busbars are arranged along the longitudinal axis of at least one of the at least two busbars at substantially the same position. The end faces can thus have a very small and/or substantially no distance from one another along the longitudinal axis of at least one of the at least two busbars. Due to the reduced width of the end portion of at least one of the busbars, it is possible to contact the at least two connection parts of the at least two busbars starting from a broad face of at least one of the busbars, despite the end faces of the at least two busbars terminating flush with one another.

In one embodiment, the widths of the end portions of at least two of the at least two busbars are reduced. As described above, the end portion of a first busbar can thus have a reduced width. In addition, in the case of a second of the at least two busbars, a width of the end portion of the second busbar can also be reduced in comparison to a width extent of the second busbar in at least parts of the overlap region. In particular, the end portion can be reduced in width such that the connection element of the first busbar is free of overlap by the end portion of the second busbar.

In particular, both the connection part of a first of the at least two busbars is free of overlap by at least one second of the at least two busbars, and the connection part of a second one of the at least two busbars is free of overlap by at least the first of the at least two busbars.

In particular, at least two of the at least two busbars can in each case be tapered in their width in their end portion in such a way that they do not cover, i.e., do not overlap, the connection element of the other busbars.

It is not only the connection element of one busbar that can be exposed by means of a reduced width of another of the at least two busbars, i.e., freed from an overlap by the other busbar. At least a part of the end portion of a busbar can also be free of overlap by other busbars.

In one embodiment, in particular a width of the end portion of a first busbar of the at least two busbars can be reduced in comparison with a width of the first busbar in at least parts of the overlap region. Additionally or alternatively, a width of the end portion of at least one second of the at least two busbars can be reduced in comparison with a width of the second busbar in at least parts of the overlap region. The reduction in the width of the first and/or the second busbar can be designed in such a way that at least a part of the end portion of the second busbar is substantially free of overlap by the end portion of the first busbar. In particular, at least a part of the end portion of the second busbar can be free of overlap by the first busbar over the entire width, for example parallel to a broad axis, of at least of a part of the end portion of the second busbar. This portion can contain the connection part of the second busbar. Likewise, at least a part of the end portion of the first busbar can also be substantially free of overlap by the end portion of the second busbar. In particular, at least a part of the end portion of the first busbar can be free of overlap by the second busbar over the entire width parallel to a broad axis of at least a part of the end portion of the first busbar. This portion can contain the connection part of the first busbar.

In the present case, it has been recognized that busbars guided one above the other are associated with considerable space savings compared to busbars guided side by side. At the same time, proximity of the broad faces of at least two busbars allows heat transfer between the busbars. Local heating of one busbar can be absorbed via the adjacent busbar. A disadvantage of busbars guided one above the other is the more complicated connection geometry. The broad faces of mutually overlapping busbars can only be reached from two opposite sides.

In the present case, it has also been found that local thinning of at least one busbar, in particular in an end portion, is associated with only a slight reduction in the electrical and thermal conductivity of the entire busbar. Since only a small part of the busbar has a reduced width, the entire busbar maintains a high thermal conductivity, capacitance and dissipation capability. Heat generated, for example, on connection parts arranged in the thinned end portion can flow from there into the wide overlap region, where it is absorbed and dissipated. The busbar thus comes very close to the thermal and electrical properties of a continuously wide busbar. In particular, the connection part according to the invention is electrically and thermally significantly more efficient than, for example, a side-by-side arrangement of two busbars, which in each case have the reduced width of the end portion according to the invention throughout. At the same time, the reduction in the width in the end portion of at least one busbar results in a substantial simplification of the connection geometry. This is because both busbars can be contacted at their broad face from a common side. The connection elements can be arranged at the same position along the longitudinal axis of the busbars. The connection parts can also be offset from one another along the longitudinal axis. The connection geometry is thus just as flexible and straightforward as with two busbars of equal width guided side by side.

The end portions of at least two of the at least two busbars can be spaced apart from one another along a broad axis of at least a part of at least one end portion of the at least two busbars, in particular by a gap. For example, the gap can be visible between the end portions in a plan view of at least one broad face of the at least two busbars. This gap can have, for example, an insulating effect between the busbars of the connection part.

A central axis can be defined for a busbar. The central axis can run between the two narrow faces of the busbar, in particular centrally between the two narrow faces. The central axis can also run centrally between the two broad faces. In particular, the central axis can pass through the center point of at least one cross section of the busbar. The cross section can be in a plane perpendicular to the longitudinal axis of the busbar. In this case, the center point can be determined, for example, as the center of gravity of the cross section.

The central axis of a busbar can be displaced with a reduction in the width of the busbar in comparison with a region of the busbar having a full width. In particular, the central axis of the busbar can be different in the overlap region of the busbar from the central axis of the busbar in the end portion of the busbar. The central axis of the end portion can be arranged eccentrically with respect to the central axis of the overlap region. The central axis of the end portion can in particular be eccentrically offset with respect to the central axis of the overlap region along the width axis of at least a part of the busbar.

The end portion of at least one of the busbars can be arranged eccentrically relative to the central axis of the busbar in at least parts of the overlap region.

In particular, the end portions of two of the at least two busbars can be substantially eccentrically spaced apart in mutually opposite directions relative to the central axis of the corresponding busbar in at least parts of the overlap region.

The thickness of a busbar can be defined as the dimension of the busbar in the direction of the surface normal to at least a part of the broad face of the busbar. The thickness is thus in particular measured perpendicular to the broad face of the busbar.

The thickness of one of the at least two busbars can be substantially constant over at least a major part of the busbar and/or over the entire busbar.

In particular, a recess in at least one of the at least two busbars can cause the reduction in the width of at least a part of the end portion of the busbar. In particular, a one-sided recess in the end portion of at least one of the at least two busbars can form the reduction in the width of the end portion. A one-sided recess reduces the width of the busbar only on one side of the busbar. In particular, only one of the two narrow faces of the busbar is changed in its course by the one-sided recess. A first of the two narrow faces of the busbar extends in the region of the one-sided recess, substantially as it would without the one-sided recess. In particular, a first narrow face can run substantially parallel to the longitudinal axis of the busbar. A second narrow face of the busbar, different from the first, can be offset in the direction of the central axis of the busbar in at least one portion of the busbar, in particular in at least a part of the end portion.

At least one of the busbars can also have a closed opening that exposes the connection part of another of the busbars. In this case, the narrow faces of the busbar can run substantially parallel to the longitudinal axis of the busbar.

In one embodiment, at least two of the at least two busbars have substantially the same width at least in parts of the overlap region.

In particular, at least two narrow faces of the at least two of the at least two busbars can terminate in a substantially flush manner in the direction of the surface normal to at least one broad face of at least one of the at least two busbars, at least in a part of the at least two busbars, in particular in the overlap region of the busbars. The connection part can thus be characterized in that at least two of the narrow faces of the at least two busbars terminate in a substantially flush manner in the direction of the surface normal to at least one of the broad faces of at least one of the busbars at least in the overlap region. Both narrow faces of at least two of the at least two busbars can also terminate in a substantially flush manner. In this case, the busbars can in particular substantially completely overlap.

The end portions of at least two of the busbars can have, at least in part, the same width.

For example, the width of the end portion of at least one of the at least two busbars can correspond substantially to half the width of the busbar in the overlap region. In particular, the width of the end portion of at least one of the at least two busbars can be smaller than half the width of the busbar in the overlap region. The widths of the end portions of at least two busbars can also in each case be dimensioned in this way. The end portions can thus be spaced apart from one another in the width of at least one of the at least two busbars.

The widths of at least two end portions in each case of one of at least two busbars can be smaller in total than the width of at least one of the busbars in at least a part of the overlap region. The at least two widths of the corresponding end portions can thereby be at least partially different from one another.

The longitudinal axes of at least two of the at least two busbars can be substantially parallel to one another. In particular in the region of the transition between the overlap region and the end portion and/or the end portion, the longitudinal axes of at least two of the at least two busbars can be parallel to one another. In particular, the broad faces of at least two of the at least two busbars can be aligned parallel to one another. In particular, the distance between two of the at least two busbars along the surface normal to at least one broad face of the at least two busbars can be substantially constant, in particular in at least parts of the overlap region, of the end portion and/or of the transition between the overlap region and the end portion.

The end portions of at least two of the at least two busbars can be spaced apart from one another at least partially by a vertical offset along the surface normal to at least a part of the broad face of at least one of the busbars. For example, the vertical offset of the end portions of two busbars can be measured as the distance between the broad face of the two busbars facing one another plus the thickness of one of the busbars. In particular, the connection elements of at least two of the at least two busbars can be spaced apart from one another, in particular by the vertical offset, along the surface normal to at least one broad face of at least one of the at least two busbars.

It is also possible for the end portions of at least two of the at least two busbars to have a smaller distance from one another along the surface normal to at least one broad face of the at least two busbars than the distance of the busbars from one another in this direction in at least parts of the overlap region. In particular, at least two of the at least two busbars can thus have a lower vertical offset relative to one another in the end portion along the surface normal to the broad face of at least a part of at least one of the at least two busbars than in at least parts of the overlap region.

The end portions of at least two of the at least two busbars can lie at least partially substantially in one plane. Consequently, the end portions can have only a small and/or substantially no distance along the surface normal to at least a part of at least one broad face of the end portion of at least one of the at least two busbars. The at least two broad faces of the end portions of at least two of the at least two busbars, which broad faces face in a common direction, can lie at least partially substantially in one plane. In this way, the connection elements of the two of the at least two busbars can also lie substantially in a common plane.

At least one of the at least two busbars and/or the longitudinal axis of at least one of the at least two busbars can at least partially have a curved profile. In particular, at least one of the at least two busbars can have a profile that is curved toward at least one other of the at least two busbars, in particular a profile that is curved about a broad axis of at least a part of the busbars. In this way, the two busbars can be brought closer together in particular in the end portion.

In particular, at least one of the at least two busbars can be brought closer to another of the at least two busbars, in particular in the end portion. For example, at least one of the at least two busbars can be curved in at least a part of the overlap region, the end portion, the transition region, and/or multiple these regions. In particular, the busbar can be curved about one and/or multiple broad axes of the busbar, for example in a substantially S-shaped manner.

By combining a curved busbar with a straight busbar, the end portions of the at least two busbars can lie at least partially in a common plane. In particular, the connection elements can lie in a common plane.

In particular, in at least parts of the overlap region, the curved busbar can substantially have a broad face aligned parallel to another of the at least two busbars. In at least parts of the end portion, the curved busbar can also have a broad face substantially aligned parallel to another of the at least two busbars. In particular, the regions of the end portions of at least two of the at least two busbars in which a connection element is arranged are thus oriented substantially parallel to one another.

Even in the case of a connection part comprising at least one curved busbar and at least one substantially straight busbar, the at least two end faces of the at least two busbars can terminate in a substantially flush manner, in particular in the direction of the width and/or in the direction of the broad axis of at least one of the end portions of the at least two busbars. The end faces can thus be substantially in the same position along the longitudinal axis of at least a part of at least one of the at least two busbars of the connection part and/or substantially not spaced apart along the longitudinal axis.

A curved busbar can be longer than a straight busbar. In particular, the end portion of a curved busbar can be longer than the end portion of a straight busbar. This can allow the end face of a curved busbar and the end face of a straight busbar to lie along the longitudinal axis of at least a part of at least one of the at least two busbars in substantially the same position as described above. The extended path of the bent connection parts in the region of the bend of the curved busbar can thus be compensated by an increased length of the curved busbar and/or the end portion of the curved busbar.

The transition between at least one broad face and/or at least one narrow face and the end face of the busbar of at least one of the at least two busbars can be substantially angular. For example, the narrow faces and/or broad faces can each substantially form an angular transition, for example a 90-degree transition, with the end face. At least one of the at least two busbars can also have an at least partially rounded shape in an end portion. For example, the shape of at least one broad face can be substantially rounded toward the end face of the busbar. For example, at least one corner of the busbar can be rounded. A rounded end portion of the busbar facilitates insertion of the busbar into a housing and/or a seal.

In one embodiment, at least one of the at least two busbars has a side recess. At least one of the busbars can thus be provided with a side recess. In particular, the side recess can be arranged in an end portion of the busbar.

The side recess can be arranged on one side of the busbar, so that the side recess interrupts the otherwise largely straight profile of the narrow face.

An outer face can be defined for a busbar, in particular for an end portion of a busbar. Said outer side limits the combination of the at least along the broad axis of at least a part of at least one of the busbars.

The side recess can be arranged in the outer face of the busbar.

The side recess can have a constant shape along the surface normal to one of the broad faces of the busbar.

In a plan view of the broad face, the edge of the side recess can extend from the longitudinal edge into the busbar substantially perpendicular to the longitudinal edge at least on one side of the side recess. Both edges of the side recess can also extend into the busbar substantially perpendicular to the longitudinal edge. Other edge profiles of at least one side of the side recess are also possible. The side recess can thus have one or two edges that are inclined in relation to the narrow face when viewed from above. For example, at least one of the edges of the side recess can extend at an angle of 30-60° relative to the narrow face. In particular, one edge can be substantially perpendicular and the oblique to the longitudinal edge. The side recess can be shaped such that it forms a hook and/or an undercut in a plan view of the broad face.

The side recess can be substantially angular, for example rectangular. The side recess can also be rounded, for example it can be substantially semicircular. The side recess can also be in the shape of a quarter circle.

A side recess can be used to snap the busbar into a holder provided for this purpose. A snap-in element of the connecting arrangement can thus engage in the side recess. A differently movable element, for example a screw element, can also engage in the side recess. Alternatively or additionally, the busbar can be surrounded by a holding element, for example by a plastics material, in particular by at least parts of the housing. Said element can engage in the side recess.

At least two of the connection elements can be arranged substantially at the same position along the longitudinal axis of at least one of the at least two busbars.

At least one of the at least two connection parts or the at least two connection parts can be arranged centrally in the end portion of the corresponding busbar with respect to the central axis of the end portion. In the case of a plan view of the broad face of the end portion, the central axis can run centrally in the broad face of the end portion along the longitudinal direction of the busbar, so that it is at substantially the same distance from both narrow faces. The connection element can also be arranged on the busbar in a decentralized and/or eccentric manner in relation to the central axis of the end portion of the busbar. At least one of the connection elements can thus be arranged substantially on the central axis of the end portion of the corresponding busbar. At least one of the connection elements can also be arranged substantially eccentrically with respect to the central axis of the end portion of the corresponding busbar.

In particular, the connection element can be arranged in an opening of the busbar, in particular in an opening in the end portion of the busbar.

In particular, the opening of the busbar extends from a first broad face to the second broad face of the busbar opposite the first broad face.

The opening can, for example, be formed as a through-hole. The through-hole can have a substantially round cross section. An elliptical, angular, in particular triangular, rectangular, pentagonal, hexagonal, polygonal, jagged or otherwise shaped cross section of the through-hole is also possible. The through-hole can have a substantially constant cross section along the thickness of the busbar, or it can have a variable cross section. For example, the through-hole can taper from a first broad face to a second broad face.

The connection part can be connected in a material-locking manner to the busbar, in particular in the opening, in particular at least partially to the inner circumferential surface of the opening. Other connection types are possible, for example a force-fitting and/or form-fitting connection. However, a material-locking connection is advantageous for the electrical and thermal conductivity between the connection element and the busbar.

At least one of the at least two connection parts can be made of an electrically conductive material. In particular, the connection part can be formed from a metal material, in particular copper, E-copper, aluminum, alloys thereof, and/or other metal materials. An at least partially or even complete coating of the connection part is also possible. The connection part can thus be coated with silver, gold, nickel and/or alloys and/or combinations thereof. In particular, the connection part can be formed from copper, in particular E-copper, and can be provided at least partially, in particular substantially completely, with a nickel-plated silver coating.

At least one of the connection elements can taper in an extension direction toward an end face of the connection element facing away from the busbar. In particular, the extension direction of the connection element can be oriented substantially parallel to the surface normal to at least one broad face of the busbar.

At least one of the at least two connection elements can have a length that is greater than, less than, or substantially equal length compared to the thickness of the busbar in the direction of the surface normal to the broad face of at least one part of the busbar. In particular, the connection part can protrude beyond the busbar on one and/or both broad faces in the direction of the surface normal to the broad face of at least a part of the busbar, be recessed therein and/or terminate substantially flush therewith.

The connection element can have a hole. In particular, the connection element can have a blind hole, in particular a through-hole.

The connection element can be formed as a connection bolt. A connection bolt can extend in an extension direction, for example, from the broad face of the busbar. The extension direction can, for example, be aligned substantially parallel to the surface normal to at least parts of the broad face of the busbar to which the connection bolt is connected. The connection bolt can terminate substantially flush with at least one of the broad faces of the busbar, in particular so that it ends within the opening in the extension direction and/or does not protrude beyond the broad face. The connection bolt can also be recessed into the busbar. The connection bolt can also protrude beyond the busbar on at least one and/or both broad faces of the busbar in the direction of the surface normal to at least one of the broad faces of the at least two busbars. The length of the connection bolt can in particular be greater and/or longer in the extension direction than the thickness of the busbar in the direction of the surface normal to at least one of the broad faces of the at least two busbars.

The connection bolt can have a substantially round cross section. The cross section of the connection bolt can also deviate from a round shape and can be, for example, oval, angular, or otherwise designed to deviate from a round shape. The connection bolt can have a collar with which it is preferably contacted on a broad face of the busbar with which it is in contact. The collar can deviate from a round shape, for example, it can have an angular shape.

The connection bolt can have a blind hole, in particular a through-hole.

The connection element can be formed as a sleeve. The sleeve in particular has a through-hole. The sleeve can be recessed into the opening on one and/or on both broad faces of the busbar, terminate flush with the broad face and/or protrude beyond the broad face, in particular in the direction of the surface normal to the broad face. The sleeve can have a collar at least on one of the two broad faces of a busbar to which the sleeve is connected. Said collar can protrude beyond the edge of the opening in the busbar in which the sleeve is arranged, parallel to the broad face, in particular circumferentially around the opening.

In one embodiment, at least one connecting sleeve is connected to at least one of the connection elements, in particular with a force fit, with a form fit and/or in a material-locking manner. For example, the connecting sleeve can be fastened to the connection element by means of a screw that is guided in particular by the connection element. For example, the connecting sleeve can have a thread for the screw.

The connecting sleeve can be formed from a conductive material, in particular from a metal material, for example copper, aluminum, alloys thereof, and/or other metals. At least one coating can be applied to the connecting sleeve. For example, silver, gold, nickel, alloys thereof, and/or multilayer coatings, for example a nickel-plated silver coating. In particular, the connecting sleeve can be formed from substantially the same material and/or the same combination of materials as the connection part.

In particular, the length of the at least one connecting sleeve can substantially correspond to the vertical offset of the end portions of the at least two busbars. In this case, the vertical offset is in particular to be determined parallel to the surface normal to at least parts of the broad face of at least one of the at least two busbars as described above. The vertical offset can determine the distance between two broad faces of the end portions of two of the at least two busbars, which broad faces face in the same direction. This vertical offset can be compensated for by at least one connecting sleeve, the length of which substantially corresponds to the vertical offset between the end portions of at least two busbars.

At least two connecting sleeves can also be connected to one connection element in each case, in particular with a force fit, with a form fit and/or in a material-locking manner, for example by means of a screw as described above. In particular, the difference in length of the at least two connecting sleeves can substantially correspond to the vertical offset of the end portions of the at least two busbars.

The connection part can further comprise a housing.

The housing of the connection part can in particular fix the at least two busbars relative to one another, in particular the broad faces of the at least two busbars being at least partially spaced apart from one another. For example, at least a part of the housing can be arranged between the at least two busbars.

The housing can at least in part be formed from a non-conducting material, in particular from a plastics material, in particular from a high temperature plastics material, in particular from PAGF15, UL94.

The end portion of at least one of the at least two busbars can be guided out of the housing in the longitudinal direction of at least one of the busbars at least partially on a connection side of the housing. In particular, a part of the end portion can be arranged in the housing. The end portion can also be arranged completely outside the housing. In particular, at least one of the connection elements can be arranged outside the housing. The housing can also substantially surround the end portion of at least one of the at least two busbars. In this case, openings can be provided in the housing that expose at least one of the connection elements. In particular, this means that the connection element can be reached on a straight line, in particular in the extension direction, through the opening.

The overlap region of at least one of the at least two busbars can be guided out of the housing in the longitudinal direction of at least one of the busbars at least partially on a laying side of the housing facing away from the connection side. The overlap region of at least one of the at least two busbars can be arranged at least in part in the housing. In particular, the overlap region is arranged largely outside the housing. The overlap region can also be arranged completely outside the housing.

The connection part can further comprise at least one seal.

At least one of the at least one seal can surround at least one of the at least two busbars. In particular, the seal can surround the at least two of the busbars together and/or individually. The seal can also in particular surround each individual one of the at least two busbars, in particular around the circumference. The seal can be in direct contact with the busbar at least partially or along the entire circumference of the busbar surrounded by the seal, in particular around the circumference. In particular, the opening of the seal in which the corresponding busbar is arranged can be adapted in cross section to the busbar. For example, the opening of the seal in the relaxed state, in particular without a busbar, can be smaller than the cross section of the busbar. As a result of the elasticity of the material of the seal, it can be placed so as to rest around the busbar.

A seal can have at least two openings. Each of the openings can surround a busbar.

A seal can have a spacing region arranged between at least two of the at least two busbars. The spacing region can, for example, adjust the distance of the busbars in the direction of the surface normal to at least a part of the broad face of at least one of the at least two busbars.

The spacing region can have a lip that extends substantially parallel to the broad face of at least one part of at least one of the at least two busbars. The lip can protrude beyond the remainder of the seal. For example, the lip can protrude beyond the remainder of the seal toward the end portion of at least one of the busbars.

At least one of the at least one seal can be formed from silicone, rubber, and/or a plastics material. For example, the seal can also be injection-molded and/or cast together with the housing, in particular in a two-component injection molding process.

At least one of the at least one seal can have at least two, preferably three or more ribs. The ribs can be arranged on the inner surface of the seal that comes into contact with at least one of the busbars. Additionally or alternatively, the ribs can also be arranged on the outer side of the seal facing away from the busbar. A rib can be formed, for example, as an elevation of the seal, in particular as a web-like elevation, which is arranged in particular around the opening of the seal, which can surround at least one busbar, in particular is arranged around the circumference.

The housing of the connection part can surround at least one of the at least two busbars with at least one busbar opening, the busbar opening preferably being adapted in cross section to the busbar. The busbar opening can, for example, at least partially contact the busbar around the circumference, for example directly or also indirectly, for example via a seal.

At least one of the at least one seal can be arranged at least partially between at least one of the at least two busbars and the housing, in particular in a press fit. The seal can be arranged, for example, in a press fit between the busbar and the housing.

The housing can comprise at least two partial pieces that together form at least one busbar opening adapted in cross section to at least one of the busbars.

At least one of the at least two partial pieces can be plugged onto at least one of the at least two busbars substantially perpendicular to the longitudinal axis of the at least two busbars and/or substantially parallel to the broad face of at least one of the busbars. In particular, at least one of the partial pieces can be plugged onto at least one of the at least two busbars starting from the narrow face of at least one of the busbars.

At least one of the partial pieces can, for example, have at least one recess whose width is adapted to the thickness of the busbar. For example, the width of the recess can substantially correspond to the thickness of the busbar. The recess can also have a width that is greater than the thickness of the busbar. In particular, the width of the recess can correspond to the thickness of the combination of a busbar and a seal surrounding the busbar. The recess can also have a width that corresponds to the thickness of at least two busbars, which are also surrounded by at least one seal. It is thus possible, for example, to plug the partial piece onto at least one busbar surrounded by a seal.

The at least two partial pieces of the housing can be fastened to one another. At least one of the at least two partial pieces can have a plug projection and/or at least one of the at least two partial pieces can have a plug receptacle. In particular, the plug projection of a first partial piece can be inserted into the plug receptacle of a second partial piece. The plug projection can be adapted in cross section to the plug receptacle. In particular, the plug projection can be inserted substantially perpendicular to the longitudinal axis of at least one part of at least one of the at least two busbars. The plug receptacle and/or the plug projection, in particular in combination, allow an at least form-fitting connection between the partial pieces. A force-fitting connection may also be possible.

A plug projection can have an elevation, for example. The elevation can extend in the plug direction along the plug projection, for example as a web. The plug receptacle can have a corresponding recess. The form fit between the plug projection and the plug device is thus improved. The plug direction can be the direction in which the plug projection is inserted into the plug receptacle.

The plug projection and/or the plug receptacle can have a cross section that is substantially constant at least partially, preferably substantially completely, along the plug direction. A form fit between the plug projection and the plug receptacle is thereby achieved, even when the plug projection is not fully inserted. The housing thus has a variable width in the plug direction.

The plug direction of at least one pair consisting of a plug projection and a plug receptacle is in particular substantially parallel to a broad face of at least one of the busbars.

In one embodiment, at least one partial piece has both a plug projection and a plug receptacle. At least two partial pieces can also each have a plug projection and a plug receptacle.

At least one fastening means can be arranged on at least one of the at least two partial pieces. Said fastening means is in particular suitable for connecting the at least two partial pieces to one another, in particular permanently. The fastening means can in particular be a force-fitting and/or form-fitting fastening means. For example, the fastening means can comprise at least one screw and/or at least one thread. For example, a screw can be attached to at least one of the partial pieces, for example by means of a hole, in particular a hole reinforced with an insert. For example, a feedthrough can be embedded in the hole, for example a feedthrough made of a metal material, for example a sleeve. A screw receptacle, for example, can be arranged in one of the partial pieces. A screw receptacle can be embedded in the partial piece, for example as a blind hole, as a through-hole and/or as a thread that is embedded in the housing, in particular one made of a metal material.

In one embodiment, at least one of the at least two busbars is at least partially insulated. In particular, the busbar is at least partially surrounded by an insulating layer. In particular, an insulating layer can be arranged on at least parts of a broad face of the busbar facing another of the at least two busbars.

At least one of the at least two busbars is, for example, coated with an insulating layer made of a non-conductive material, for example a plastics material. A paint or a similar electrically non-conducting coating is also possible.

In particular, the busbar can be insulated in parts of the overlap region. The insulated region of the busbar can, in particular, extend from the laying direction into the housing from outside the housing.

A part of the end portion of at least one of the at least two busbars can be insulated. In particular, the outer face of the end portion can be at least partially insulated. The broad faces of the end portion can also be at least partially insulated. If the reduction in the width of the end portion is formed by a one-sided recess, the side edge can be free of insulation in the region of the recess. The connection element can be located in a stripped region of the end portion. An end-face region of the end portion can in particular be completely stripped.

At least one of the at least two busbars can consequently be at least partially stripped at least in the end portion. In particular, the outer face of the busbar can be at least partially insulated, in particular in the end region. The inner face of the busbar, which is the other narrow face of the busbar different from the outer face, can also be at least partially stripped.

A further aspect relates to a plug.

The plug comprises a plug housing.

The plug housing can preferably be formed from a non-conducting material. For example, it can be formed from a plastics material, in particular a high temperature plastics material. For example, the plug housing can be formed from substantially the same material as the housing of the connection part.

The plug housing can have fastening means. For example, the plug housing can comprise force-fitting and/or form-fitting fastening means. In particular, a screw receptacle, in particular a thread, as described above in the case of the housing of the connection part, can be comprised on the plug housing. The plug housing can also comprise a hole and/or a feedthrough for a screw, as described above for the housing of the connection part.

At least one fastening means can be arranged on the connection part, in particular on the housing of the connection part, and/or on the plug, in particular on the plug housing. In particular, this can be a force-fitting and/or form-fitting fastening means, in particular at least one screw and/or at least one thread.

The plug can further comprise a connection part, in particular a connection part according to the invention as described above. The at least two busbars of the connection part can be guided into the plug housing in each case with at least parts of one end portion.

In particular, the housing of the connection part can contact the plug housing, in particular contact the region circumferentially surrounding at least one of the and/or the at least two busbars.

At least one seal can be arranged between the plug housing and the housing of the connection part. Preferably, the housing can rest indirectly against the plug housing via the seal, preferably around the circumference. In particular, the seal can preferably be arranged in a press fit between the housing of the connection part and the plug housing.

Fastening means on the housing of the connection part and/or on the plug housing can cause a contact pressure between the housing and the plug housing. The fastening means can be used to create a press fit of the seal between the two housings.

A further aspect is a system consisting of a connection part according to the invention and a plug according to the invention.

In particular, the fastening means can cause a contact pressure between the housing and the plug housing, which contact pressure holds the seal in a press fit.

The subject matter of the invention is explained in more detail below with reference to drawings showing exemplary embodiments. In the drawings.

Figure 1:
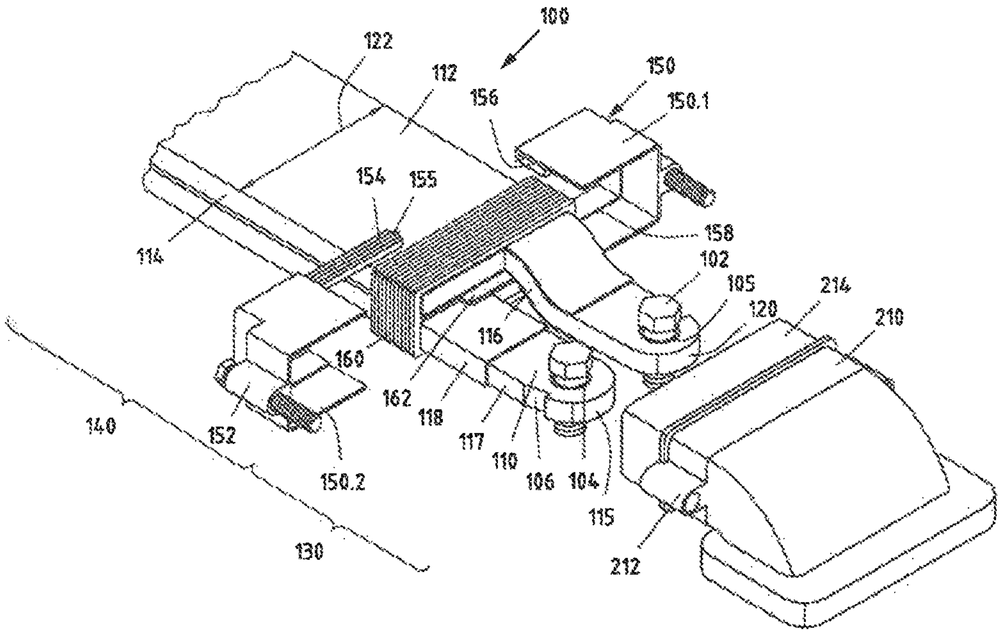
FIG. 1 shows a connection part according to the invention according to one embodiment.

FIG. 1 shows a connection part 100 according to the invention according to one embodiment. Said connection part comprises a first busbar 110 and a second busbar 120.

A busbar 110, 120 comprises two broad faces 112 and two narrow faces 114. An end face 115 can also be defined at the end of the busbar 110, 120.

An overlap region 140 can be distinguished from a separate end portion 130 of the busbars 110, 120.

In the embodiment shown, the busbars 110, 120 substantially completely overlap one another in the overlap region. In this case, the busbars 110, 120 have substantially the same width 122. The narrow edges 114 terminate in a substantially flush manner.

In the end portion 130 of the two busbars 110, 120, these each have a reduced width 122. In particular, the width 122 of the end portions 130 of the busbars is in each case less than half the width 122 in the overlap region 140.

The first busbar 110 comprises a connection element 104, the second busbar 120 comprises a connection part 105. The connection elements 104, 105 are arranged in a part of the end region 130. The connection elements 104, 105 are formed as a sleeve, each of which is arranged in an opening of the corresponding busbar 110, 120. The connection part 104 of the first busbar 110 protrudes beyond the broad face 112 of the busbar 110. The connection part 105 of the second busbar 120 is recessed in the opening of the busbar 120. Screws 102 are arranged in the connection elements 104, 105.

It can also be seen that the busbars 110, 120 each have a side recess 106. Said side recess is hook-shaped. In particular, the edge of the side recess 106 facing the end-face end of the busbars 110, 120 is inserted at least partially steeply, in particular substantially perpendicular to the outer face 117 of the busbar 110, 120, into the broad face 112 of the busbar 110, 120. The edge of the side recess 106 facing the overlap region of the busbars 110, 120 is inserted less steeply, in particular at a shallow angle to the outer face 117 of, for example, 45 degrees or less, into the broad face 112 of the busbar 110, 120.

The end of the busbars is rounded. The end face 115 is thus not a planar surface, but describes an arc. As a result, the busbars can be inserted into a corresponding receiving environments with a lower resistance.

The second busbar 120 is curved. In the embodiment shown, the busbar 120 is designed to be curved in an S-shaped manner. In particular, the end face end of the end portion 130 of the busbar 120 has substantially the same orientation of the broad face 112 as in the overlap region 140.

Due to the curvature of the second busbar 120, the end portions 130 of the two busbars 110, 120 lie substantially in one plane. In particular, the connection elements 104, 105 arranged in the busbars 110, 120 can also lie in one plane.

The busbars 110, 120 can each be at least partially insulated. In particular, an insulating layer 118 can be arranged on parts of the surface of the busbars 110, 120. The busbars can be substantially completely insulated in the overlap region 140. The busbars 110, 120 can also be stripped in parts of the end portion 130. Shown is a stripping at the end face ends of the busbars, which in particular accommodate the connection elements 104, 105. The insulation 118 is also removed on the inner faces 116.

The connection part 100 further comprises a seal 160. As shown, the seal can surround the busbars 110, 120 individually or together. The seal 160 can have openings adapted in cross section to the busbars 110, 120. Multiple ribs can be seen on the seal 160. Said ribs are arranged on the outer circumference of the seal 160.

It can also be seen that the seal has a lip 162. The lip 162 is arranged between the busbars 110, 120. In particular, the lip 110, 120 is arranged between the broad faces and extends substantially parallel to the broad face 112 of at least one of the busbars 110, 120 in the direction of the end portion 130 and/or end of the busbars 110, 120. The lip 162 can protrude beyond the remainder of the seal 160 in the direction of the end and/or the connection element 104, 105 of at least one of the busbars 110, 120. The lip 162 can be used as a spacer. In particular, the curved second busbar 120 can rest on at least parts of the lip 162, in particular on parts of the end region-side end region of the lip 162.

A housing 150 can also be seen in FIG. 1. The housing 150 has in particular two partial pieces 150.1, 150.2. The partial pieces 150.1, 150.2 can together form an opening for the two busbars 110, 120.

The partial pieces 150.1, 150.2 can be connected to one another. In particular, one partial piece 150.2 has at least one plug projection 154 and one partial piece 150.1 has at least one plug receptacle 156. In particular, each of the partial pieces has both a plug receptacle 156 and a plug projection 154. These can each be arranged on opposite broad faces 112 of the busbars 110, 120 arranged one above the other.

The plug projection 154 can be inserted into the plug receptacle 156. In particular, the plug receptacle 156 is adapted in cross section to the plug projection 154. The plug projection 154 and the plug receptacle 156 extend along an extension direction that extends in particular parallel to the broad face of the busbar and/or perpendicular to the longitudinal axis of at least one of the two busbars.

As shown, the plug projection 154 and/or the plug receptacle 156 can be arranged on the side of the housing 150 facing the overlap region.

The plug projection 154 can have an elevation 155 along the plug direction. The elevation 155 can be web-shaped as shown. The elevation 155 can extend along the plug direction. The plug receptacle 155 can have a corresponding groove for receiving the elevation 155.

The housing 150, in particular at least one of the housing parts 150.1, 150.2, can have an elevation 158 on the inner circumferential surface. The elevation 158 can be formed as a web-shaped elevation 158, in particular a straight web-shaped elevation 158. The elevation 158 can engage between at least two of the ribs of the seal 160.

Fastening means 152 can be arranged on the housing 150. Fastening means 152 can be arranged in each case on each of the partial pieces 150.1, 150.2. For example, the fastening means can comprise screws as shown. At least one screw can be inserted through a hole in the housing 150. In particular, the screw can be arranged on the housing in a captive manner.

A plug housing 210 can be provided next to the housing 150. Said plug housing can comprise fastening means 212. The fastening means of the housing 150 can be fastenable to the fastening means 212 of the plug housing 210. For example, as shown, the plug housing 210 can have holes as fastening means, into which screws 152 of the housing 150 can be screwed.

The housing 150 can have a greater extension in the longitudinal axis of at least one of the busbars 110, 120 than the seal 160 in this direction. The seal 160 can be completely surrounded by the housing 150.

In the region facing the end portion 130, the housing 150 can have a larger cross section than in a region facing the overlap region 140. In particular, a circumferential gap can remain between the busbars 110, 120 and/or between the seal 160 and the housing 150. A circumferential surface 214 of the plug housing 210 can be inserted into this gap. In particular, the circumferential surface 214 can contact the seal 160. A watertight, gas-tight and/or pressure-tight connection between the housing 150 and the plug housing 210 is thus possible.

The busbars 110, 120 can be introduced into the housing 210 in a watertight, gas-tight and/or pressure-tight manner.

Figure 2:
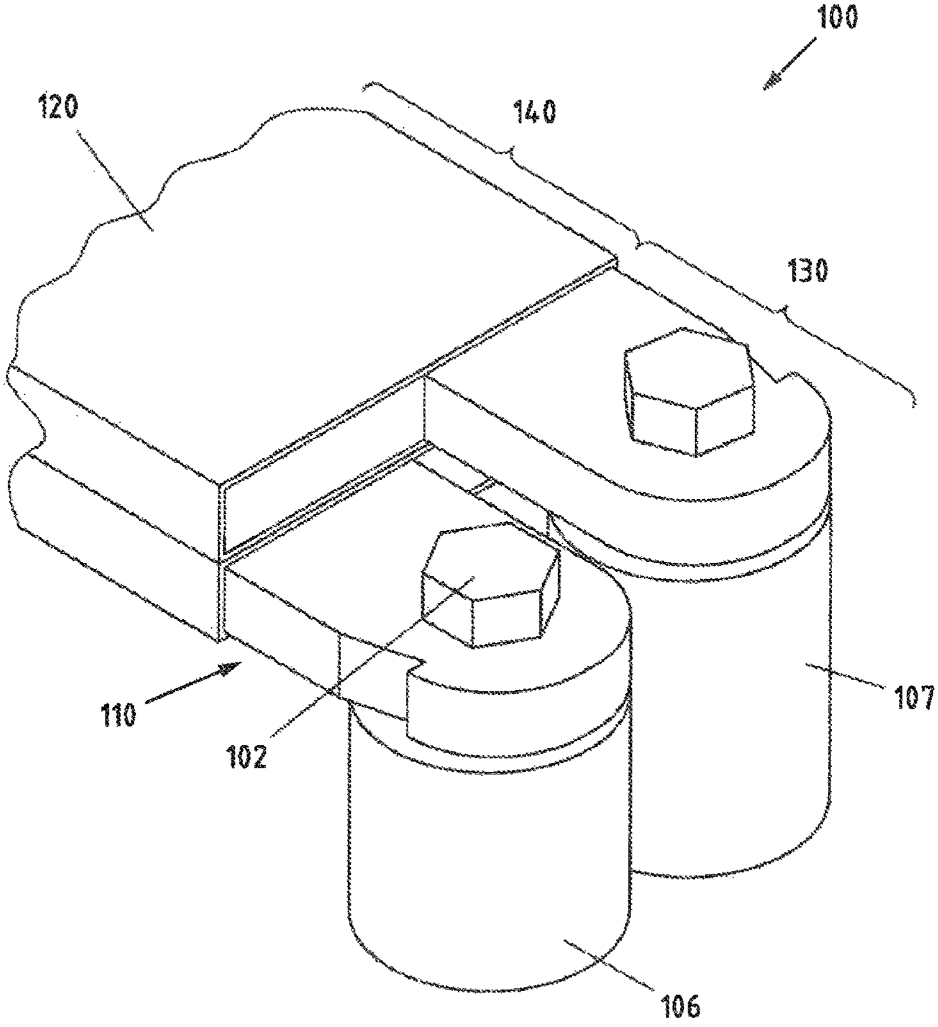
FIG. 2 shows a connection part according to the invention according to one embodiment.

FIG. 2 shows a further embodiment of the connection part according to the invention according to one embodiment.

The busbars 110, 120 are parallel to one another. The busbars 110, 120 are partially curved in the overlap region 140. In contrast, the two busbars 110, 120 are guided in the end portion 130 straight along a common longitudinal axis. The end portion can be shorter compared to the design of FIG. 1 with a curved busbar 120.

Since the busbars 110, 120 are not curved, the end portions of the corresponding busbars 110, 120 are spaced apart from one another by a vertical offset along the surface normal to at least one part of the broad face 112 of at least one of the busbars.

Connecting sleeves 106, 107 can be used to compensate for the vertical offset. The connecting sleeves 106, 107 extend in an extension direction that, in the case shown, is substantially perpendicular to the broad face of the corresponding end portions of the busbars 110, 120. The ends of the connecting sleeves 106, 107 remote from the end portions are located at substantially the same position along the extension direction of at least one of the connecting sleeves 106, 107.

The invention claimed is:

1. A connection part comprising at least two busbars, wherein a broad face of a first of the at least two busbars overlaps with a broad face of a second of the at least two busbars in an overlap region of the at least two busbars, and the longitudinal axes of the at least two busbars runs substantially parallel to one another in at least parts of the overlap region, and the at least two busbars open into a common end portion with their corresponding end portions different from the overlap region, and at least one connection element arranged in each case on one of the at least two busbars in the end portion of the busbar, wherein the connection elements of the at least two busbars being spaced apart from one another, wherein a width of the end portion of at least the first busbar being reduced in relation to a width of the first busbar in at least parts of the overlap region in such a way that the connection element of the second busbar is free of overlap by the end portion of the first busbar, wherein at least one seal surrounds at least one of the at least two busbars.

2. The connection part according to claim 1, wherein a width of the end portion of the second busbar is reduced in comparison with a width of the second busbar in at least parts of the overlap region in such a way that the connection element of the first busbar is free of overlap by the end portion of the second busbar.

3. The connection part according to claim 1, wherein the end portion of at least one of the busbars is arranged eccentrically relative to the central axis of the busbar in at least parts of the overlap region and/or a one-sided recess of the busbar forms the reduction in the width of the end portion.

4. The connection part according to claim 1, wherein the narrow faces of the at least two busbars terminate in a substantially flush manner in the direction of the surface normal to at least one of the broad faces of at least one of the busbars at least in the overlap region, and/or the end faces of the at least two busbars are arranged along the longitudinal axis of at least one of the busbars at substantially the same position.

5. The connection part according to claim 1, wherein at least two of the at least two busbars in the end portion have a smaller distance from one another along a surface normal to at least one broad face of at least one of the busbars than in the overlap region, in particular in that the end portions of at least two of the busbars are at least partially located in a plane.

6. The connection part according to claim 1, wherein the longitudinal axis of at least one of the at least two busbars has an at least partially curved profile, in particular a profile curved toward at least one other of the at least two busbars.

7. The connection part according to claim 1, wherein at least one of the busbars is provided with a side recess, in particular in an end portion, in particular in an outer face of the busbar.

8. The connection part according to claim 1, wherein the at least two of the connection elements are arranged substantially at the same position along the longitudinal axis of at least one of the at least two busbars.

9. The connection part according to claim 1, wherein the connection element is formed as a connection bolt and/or in that the connection element is formed as a sleeve.

10. The connection part according to claim 1, wherein at least one of the connection elements tapers in an extension direction toward an end face of the connection element facing away from the busbar.

11. The connection part according to claim 1, wherein at least one of the at least two connection elements has a through-hole, in particular in the direction of the surface normal to at least parts of the broad face of the busbar.

12. The connection part according to claim 1, wherein at least one connecting sleeve is connected to at least one of the connection elements, in particular with a force fit, with a form fit and/or in a material-locking manner, for example by means of a screw, in particular the length of the at least one connecting sleeve substantially corresponding to the vertical offset of the end portions of the at least two busbars, and/or in that at least two connecting sleeves are in each case connected to a connection element, in particular with a force fit, with a form fit and/or in a material-locking manner, for example by means of a screw, in particular the difference in length of the at least two connecting sleeves substantially corresponding to the vertical offset of the end portions of the at least two busbars.

13. The connection part according to claim 1, wherein the at least one seal surrounds the at least two busbars together and/or individually.

14. The connection part according to claim 1, wherein at least one of the at least one seal is formed from silicone, rubber, and/or a plastics material, in particular in that the housing and the seal are injection molded and/or cast together, in particular in a two-component injection molding process.

15. The connection part according to claim 1, wherein at least one of the at least one seal has at least two, preferably three or more ribs.

16. The connection part according to claim 1, wherein the housing surrounds at least one of the at least two busbars with at least one busbar opening, the busbar opening preferably being adapted in cross section to the busbar, the housing in particular comprising at least two partial pieces that jointly form at least one busbar opening adapted in cross section to at least one of the busbars.

17. The connection part according to claim 16, wherein at least one of the at least two partial pieces can be plugged onto at least one of the at least two busbars substantially perpendicular to the longitudinal axis of the at least two busbars and/or substantially parallel to the broad face of at least one of the busbars, in particular starting from the narrow face of at least one of the busbars.

18. The connection part according to claim 16, wherein at least one of the at least two partial pieces has a plug projection and/or at least one of the at least two partial pieces has a plug receptacle, in particular the plug projection being insertable into the plug receptacle, in particular being insertable substantially perpendicular to the longitudinal axis of at least one part of at least one of the at least two busbars, and/or in that at least one fastening means is arranged on at least one of the at least two partial pieces, which fastening means connects the at least two partial pieces to one another, in particular a force-fitting and/or form-fitting fastening means, in particular at least one screw and/or at least one thread.

19. The connection part according to claim 1, wherein at least one of the at least one seal is arranged at least partially between at least one of the at least two busbars and the housing, in particular in a press fit.

20. A plug having comprising:
a plug housing,
a connection part according to claim 1, the at least two busbars being guided in each case with one end portion into the plug housing and the housing of the connection part contacting the plug housing in a region that surrounds the busbars, preferably indirectly via a seal that is preferably arranged in a press fit between the housing of the connection part and the plug housing.

21. The plug according to claim 20, wherein at least one fastening means is arranged on the connection part, in particular on the housing of the connection part, and/or the plug, in particular the plug housing, in particular a force-fitting and/or a form-fitting fastening means, in particular at least one screw and/or at least one thread.

* * * * *